United States Patent [19]

Huetter

[11] Patent Number: 4,960,032

[45] Date of Patent: Oct. 2, 1990

[54] APPARATUS FOR LOCKING AND UNLOCKING A SAFETY FOR SUBAMMUNITION BODIES

[75] Inventor: Horst Huetter, Tegernsee, Fed. Rep. of Germany

[73] Assignee: Messerschmitt-Boelkow-Blohm GmbH, Munich, Fed. Rep. of Germany

[21] Appl. No.: 416,931

[22] Filed: Oct. 4, 1989

[30] Foreign Application Priority Data

Oct. 5, 1988 [DE] Fed. Rep. of Germany ....... 3833817

[51] Int. Cl.$^5$ .......................... B64D 1/04; F42C 15/12
[52] U.S. Cl. ...................................... 89/1.51; 89/1.55
[58] Field of Search ....................... 89/1.51, 1.55, 1.56, 89/1.57

[56] References Cited

U.S. PATENT DOCUMENTS

| | | | |
|---|---|---|---|
| 2,478,019 | 8/1949 | Sonntag | 89/1.51 |
| 2,891,447 | 6/1959 | Buecker | 89/1.51 |
| 3,200,707 | 8/1965 | West | 89/1.51 |
| 3,613,589 | 10/1971 | Apstein et al. | 89/1.55 |
| 3,625,106 | 12/1971 | Russo et al. | 89/1.55 |
| 4,348,936 | 9/1982 | Fulchiron et al. | 89/1.55 |
| 4,706,541 | 11/1987 | Coutin | 89/1.55 |
| 4,867,035 | 9/1989 | Boucard et al. | 89/1.55 |

FOREIGN PATENT DOCUMENTS

| | | |
|---|---|---|
| 721106 | 4/1942 | Fed. Rep. of Germany . |
| 3001203 | 7/1980 | Fed. Rep. of Germany . |
| 3430107 | 3/1985 | Fed. Rep. of Germany . |

Primary Examiner—David H. Brown
Attorney, Agent, or Firm—W. G. Fasse; D. H. Kane, Jr.

[57] ABSTRACT

An apparatus for locking and unlocking a safety for subammunition bodies is part of and mounted in a subammunition container secured to a carrier such as an aircraft body. The subammunition container is permanently attached to the carrier and not intended to be dropped. One section of the device includes a housing (3) containing a release mechanism (4), a computer (5) and a power source (6). The housing (3) is secured inside the carrier (1) at the bottom side thereof. Another section of the device includes the safety device (14) or (25) and the setting or operating mechanism (9). The safety device and the operating mechanism are mounted in the container (2) for the subammunition. The safety device includes a pin (8) that can be moved by a solenoid between two positions. A loop (7) at one end of a rope pull (18) loops around the pin (8) which holds the loop in a first position with a smaller force and in a second position with a larger force. The other end of the rope is connected to the safety device for unlocking the safety device with the aid of the setting or operating mechanism (9) which includes a piston cylinder device for operating the rope pull (18).

6 Claims, 3 Drawing Sheets

APPARATUS FOR LOCKING AND UNLOCKING A SAFETY FOR SUBAMMUNITION BODIES

FIELD OF THE INVENTION

The invention relates to an apparatus for locking and unlocking a safety of subammunition bodies. The term "subammunition bodies" refers to weapons that are dropped or ejected from a carrier, such as an aircraft, as opposed to ammunition that is fired from a gun. More specifically, such subammunition bodies are housed in a subammunition container which is permanently secured to an aircraft or other flying body.

BACKGROUND INFORMATION

Mechanisms for locking and unlocking of so-called drop weapons such as bombs are known in the art for use in connection with bombs which are directly housed in a bomb bay of a flying body. In such mechanisms, the drop weapons are mounted and secured with holding bails and these bombs have a safety which is unlocked or if necessary, locked again by the flying crew by operating mechanisms which are activated either directly or indirectly and independently for each bomb when the dropping is intended. Such mechanisms for locking and unlocking the safety are, for example, described in German Patent Publications (DE-OS) 3,001,203 and 3,430,107. Subammunition bodies such as bombs, mines, or small flying bodies, which are housed in a subammunition container secured outside to a flying body and which cannot be dropped, are not subject to any further influence, except for unlocking the safety either by a member of the crew or by mechanisms provided in the flying body. The unlocking of the safety takes place through a current impulse which ignites the gas generators which produce gas for ejecting the subammunition bodies out of their housing or container.

OBJECTS OF THE INVENTION

In view of the foregoing it is the aim of the invention to achieve the following objects singly or in combination:

to provide a mechanism of the type mentioned above in which the locking and unlocking of the safety for a subammunition weapon is possible either by a member of the flying crew or by separate devices provided in the flying body;

to make sure that the safety of a subammunition weapon can be returned into the safety-on position after it has been unlocked into the safety-off position; and to make sure that subammunition weapons housed in a container can now be controlled in the same safe manner as was possible heretofore for bombs in a bomb bay.

SUMMARY OF THE INVENTION

The above objects have been achieved according to the invention by the combination of the following features. A release device in the flying body is connected through an operating or setting mechanism and with a priming or safety means in the subammunition container by means of a releaseable rope pull. The term "priming" as used in this context refers to a means for unlocking the safety to make the weapon ready for dropping or discharge. A holding force that is effective in the release device on the rope pull is either larger or smaller in accordance with an input to the release mechanism. More specifically, the holding force is larger than the force applied to the rope pull by the setting mechanism and the holding force is smaller than a force required for the operation of the priming or safety means.

The apparatus according to the invention makes possible the direct influencing out of the flying body, of the locking and unlocking or priming of the subammunition bodies which are housed in a subammunition container secured to the outside of the carrier body such as an aircraft or rocket or the like. Due to the feature that the release mechanism and the setting mechanism are effective on the rope pull for the operation of the priming or safety means, it is now possible to not only prime the subammunition bodies, but to also switch the safety back on, either directly by a member of the flying crew or in response to signals from a computer. Thus, the subammunition bodies can be controlled in the same manner as is possible for the control of bombs in a bomb bay of a flying body, namely, the safety can be switched on or off and on again as desired.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
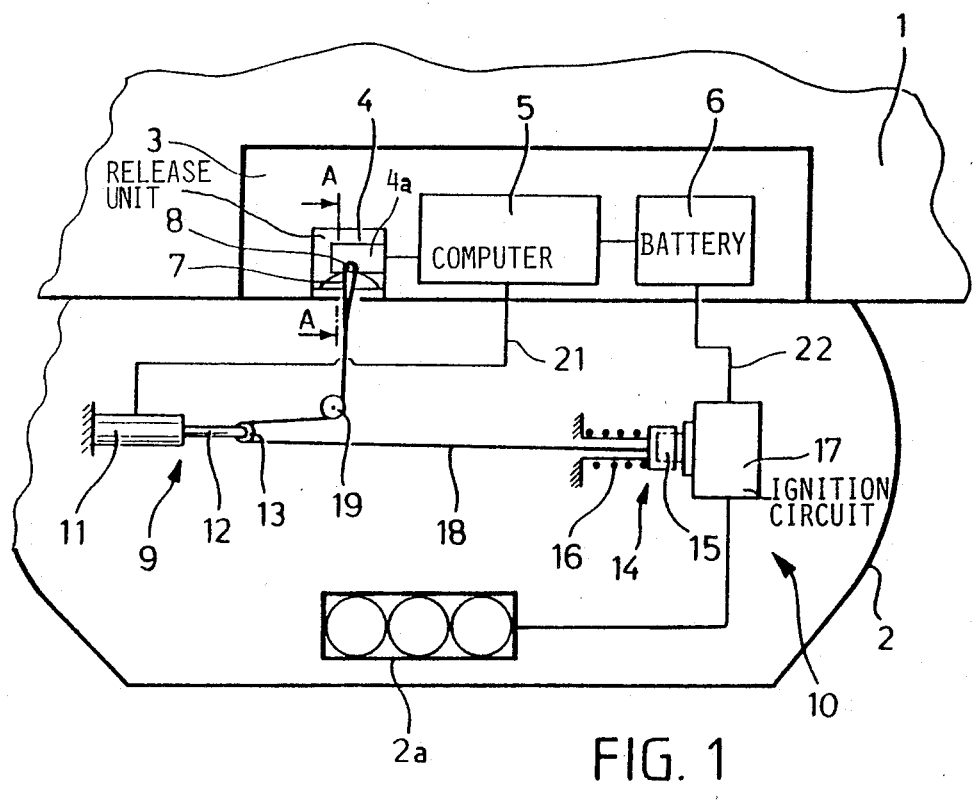
FIG. 1 illustrates a side view of an apparatus for locking and unlocking of the safety mechanism of a subammunition body housed in a subammunition container secured to a flying body, whereby the apparatus is shown in the safety-on condition.

FIG. 1 shows a cut-out portion of the underbelly side of a flying body 1, such as an aircraft, to which a subammunition container 2 is secured in a permanent non-droppable manner as is conventional. The so-called subammunition 2a such as mines, flying bodies, and small bombs are housed in the container 2, in a conventional manner. Within the body 1 there is a casing 3 in which a release unit 4, a computer 5 and a battery 6 are housed. The release unit 4, the computer 5, and the battery 6 are interconnected by electrical conductors. A loop 7 of a pull rope 18 is secured to the release unit 4 by means of a safety pin 8. A relay or solenoid 4a shown in FIGS. 1A and 1B of which the pin 8 forms an armature drives the the pin 8 back and forth between two positions. The relay or solenoid 4a is part of the release unit 4. In the first safety-on position shown in FIG. 1A the pull rope loop 7 can be pulled off the pin 8 by a force of, for example, 200 Newton, whereby an ignition plug 15 cannot be pulled out of an ignition circuit 17 so that the plug 15 keeps the ignition circuit 17 interrupted. In the second position shown in FIG. 1B the pin 8 extends entirely through the loop 7, whereby the loop cannot be pulled off the pin 8, so that the ignition plug 15 can be pulled out of the ignition circuit 17, thereby closing the ignition circuit 17. However, by applying a larger force, for example of 800 Newton, it is possible to shear off the pin 8.

Figures 1A, 1B:
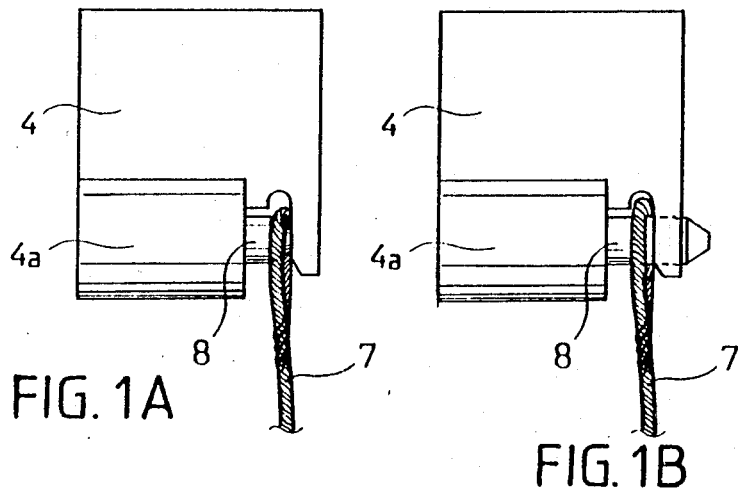
FIG. 1A is a view toward the plane A-A in FIG. 1 showing a safety pin in the safety-on position.
FIG. 1B is the same view as FIG. 1A, but showing the safety pin in the safetyoff position.

A safety control device 10 including a setting mechanism 9 for locking and unlocking a safety mechanism 14 including the ignition plug 15 and the ignition circuit 17, is mounted in the subammunition container 2. The setting mechanism 9 comprises a piston cylinder device 11 with a piston rod 12. A rope pulley 13 is attached in a rotatable manner to the free end of the piston rod 12. The above mentioned ignition plug 15 of the safety mechanism 14 is an electrical short-circuit plug 15 which is biased by a spring 16 into the locking position in which the safety mechanism is in its on-position in which it is effective to prevent an ignition. The ignition plug 15 cooperates with the ignition circuit 17 into which the plug 15 is pressed by the spring 16 when the device is in its on-condition thereby interrupting the ignition circuit 17 as mentioned. The pull rope 18 extends with its loop 7 around the pin 8 and is connected with its other end to the short-circuit ignition plug 15, thereby running over a guide pulley 19 and the pulley 13. The operation of the piston cylinder device 11 of the setting mechanism 9 is controlled by the computer 5. For this purpose the piston cylinder device 11 is connected by an electrical conductor 21 to the computer 5. The ignition circuit 17 of the safety mechanism 14 is connected to the battery 6 by an electrical conductor 22 forming part of the ignition circuit for igniting, for example a gas generator for the expulsion of subammunition bodies 2a. The just described control is such that the piston rod 12 can exert a force on the rope pull 18 of, for example, 300 Newton, when the piston moves to the left into the cylinder 11. The rope pull 18 transmits this force to the loop 7 and to the short circuit ignition plug 15. FIGS. 1 and 1A show the safety-on state in which the loop 7 can be pulled off the pin 8, but the plug 15 cannot be pulled out so that the plug keeps interrupting the ignition circuit.

The computer 5 monitors the status of the locking and unlocking mechanism for the safety mechanism 14. The safety-on condition which of the pin 8 shown in FIG. 1A is maintained at all times when the aircraft is on the ground and during all flight conditions, except when the intended mission is being performed. In the safety-on state shown in FIG. 1A, the following operational conditions prevail:

(a) the pin 8 is in its first position shown in FIG. 1A with a small holding force for the rope loop 7,
(b) the setting mechanism 9 is not actuated,
(c) the ignition circuit 17, 22 is interrupted by the plug 15. An unintended pull on the rope 18 would cause the loop 7 to slip off the pin 8, thereby leaving the plug 15 in its ignition circuit interrupting position.

Figure 2:
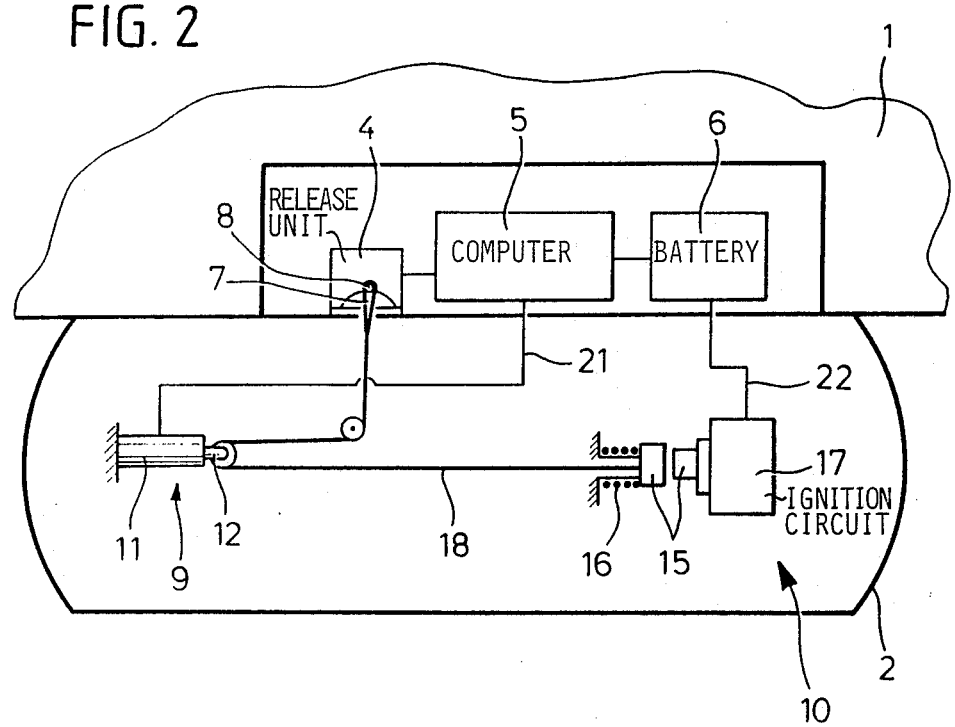
FIG. 2 shows the apparatus according to FIG. 1, in the safety-off or primed condition.

FIG. 2 and FIG. 1B show the safety control device 10 in its safety-off condition with the rope loop 7 firmly held in place by the pin 8 as shown in FIG. 1B, whereby the subammunition bodies 2a are ready for expulsion from the container 2. To establish the status shown in FIG. 2, the following operational conditions must be satisfied:

(a) the pin 8 is in its second state of FIG. 1B for applying a high holding force to the rope loop 7 whereby the rope 18 can pull out the plug 15, (b) the computer 5 provides an instruction signal to the setting mechanism 9 through the electrical conductor 21, whereby the piston rod 12 moves to the left into the cylinder 11,
(c) the piston rod 12 pulls the rope pull 18 and thus the shortcircuit plug 15 out of its socket against the force of the spring 16,
(d) removal of the short-circuit plug 15 closes the ignition circuit 17 for starting gas generator means not shown to generate the gas required for ejecting the subammunition bodies 2a from the container 2.

Figure 3:
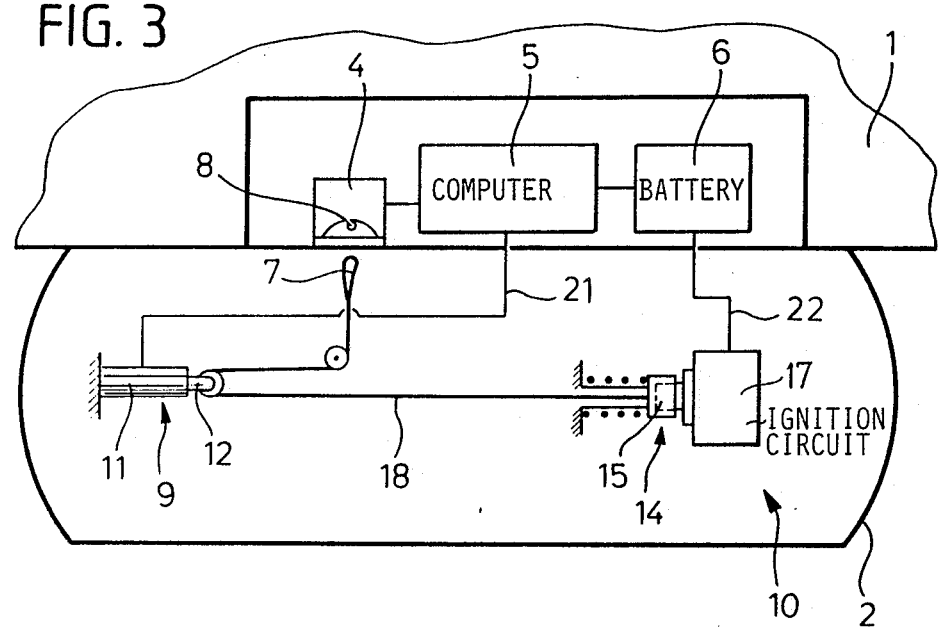
FIG. 3 shows the apparatus according to FIG. 1, when a failure has occurred.

FIG. 3 illustrates the ability of the present locking and unlocking mechanism to avoid priming the ignition circuit 17 when an erroneous removal of the rope loop 7 from the pin 8 occurred, in other words, the setting mechanism 9 malfunctioned. The pin 8 must not assume the position of FIG. 1B if the loop 7 is not in its proper place for the full engagement of FIG. 1B. Such a situation can occur if in the safety-on condition, an accidental operating impulse is supplied to the setting mechanism 9, for example, as an erroneous operation of a key or button by a crew member or due to any other erroneous function or even due to an extraneous impulse coming from the outside. The computer 5 is programmed for this purpose in such a way that in response to such a malfunction, it is prevented that the pin 8 in the release unit 4 can be shifted into its high holding force position of FIG. 1B. As a result, the accidental movement of the piston rod 12 to the left into the cylinder 11 can pull off the loop 7 from the pin 8 without simultaneously withdrawing the short-circuit plug 15 from its socket. This is so because pulling off the loop 7 from the pin 8 requires less force than withdrawing the short-circuit plug 15 from its socket. In other words, the computer 5 is so programmed that the simultaneous shifting of the pin 8 into its second position and the intentional actuation of the setting mechanism 9 can take place only if real, or rather intended, mission conditions are present. This feature enables the present mechanism to prevent an attack on one's own positions by including in the program of the computer 5 respective friend/foe recognition codes.

Figure 4:
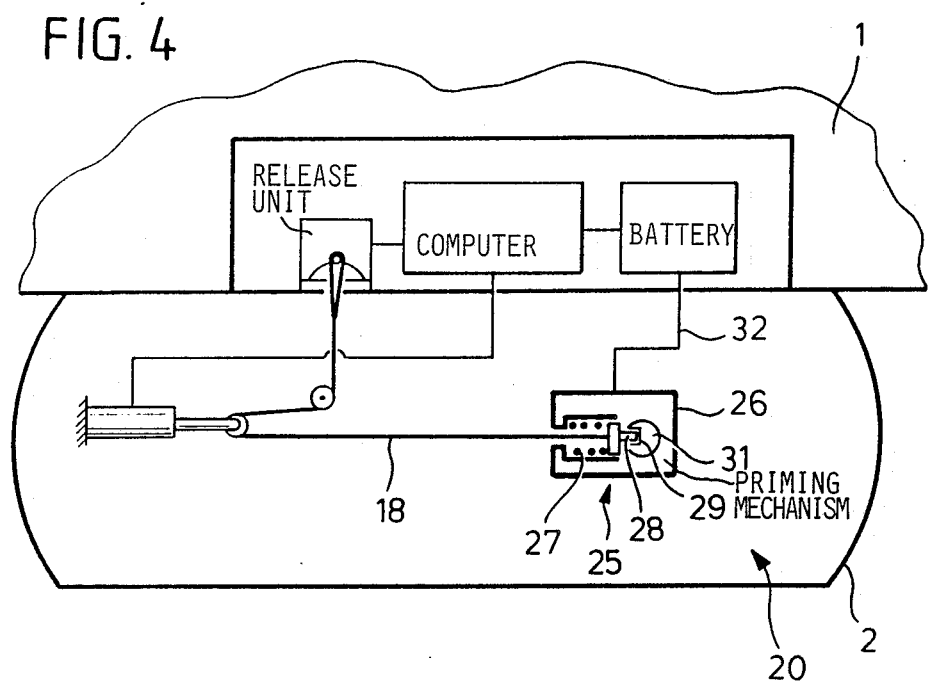
FIG. 4 shows a second embodiment of an apparatus according to the invention similar to that of FIG. 1, and showing the apparatus in the safety-on state.
Figure 5:
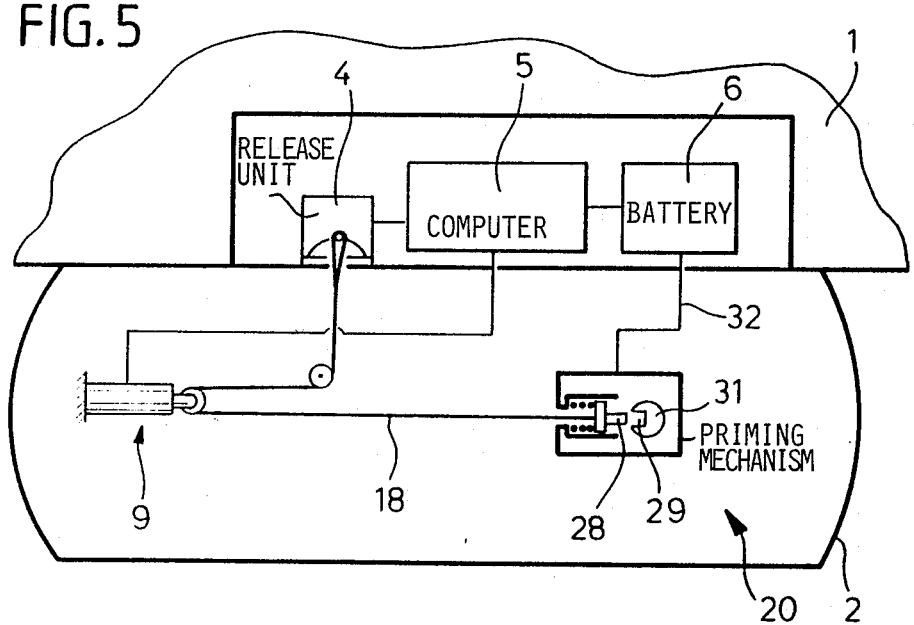
FIG. 5 shows the apparatus of FIG. 4 in the safety-off or primed condition.

FIGS. 4 and 5 illustrate a second embodiment, wherein a locking and unlocking mechanism 20 also comprises the subammunition container 2 secured to the body 1 of a carrier. The embodiment of FIGS. 4 and 5 differs from the embodiment shown in FIGS. 1, 2, and 3 only in the safety means in the form of a priming mechanism 25 in a housing 26. FIG. 4 illustrates the safety-on condition of the mechanism 20, wherein a spring 27 biases a slide pin 28 into a recess 29 of a slide valve member 31. FIG. 5 shows the safety-off position of the priming mechanism corresponding to the situation illustrated in FIG. 2 for the first embodiment. The setting mechanism 9 operates as described above by pulling the slide pin 28 out of the recess 29 against the force of the spring 27 in response to a priming signal. As a result, the slide valve member 31 driven, for example, through a solenoid operated by an electric impulse through the conductor 32 from the battery 6, opens an ignition channel of a gas generator. The generated gas then ejects the individual subammunition bodies 2a from the container 2 as is conventional. Instead of using a slide valve member 31 a rotatable slide valve member could be used to perform the same function. Incidentally, the piston cylinder device 11, 12 may be drive electrically or fluidically.

Although the invention has been described with reference to specific example embodiments, it will be appreciated that it is intended to cover all modifications and equivalents within the scope of the appended claims.

What is claimed is:

1. An apparatus for locking and unlocking a safety device for subammunition bodies suitable for discharge from a carrier, comprising a container for holding said subammunition bodies (2a), control means including release means (4), safety means (14, 25) for permitting or preventing said discharge, rope pull means (18) operatively interconnecting said release means (4) and said safety means, said release means including a pin (8) shiftable between a first safety-on position and a second safety-off position, one end (7) of said rope pull means (18) looping around said pin (8), the other end of said rope pull means being connected to said safety means, said pin (8) being capable of releasing said looping end (7) from said pin in said safety-on position, said apparatus further including drive means (4a) for said pin (8) in said release means, whereby a small force is sufficient for removing said looping end (7) from said pin (8) when said pin is in said first safety-on position, said pin (8) passing fully through said looping end (7) when said pin is in said safety-off position so that a large force is required to shear off said pin (8) for releasing said looping end, operating means (9) for operating said rope pull means (18) comprising a drive rod (12) carrying a pulley (13) engaging said rope pull means (18) for driving said rope pull means with an operating force which is larger than said first mentioned small force and substantially smaller than said second mentioned force, said control means further comprising a computer (5) connected to said release means (4) and to said operating means (9), said computer providing instruction signals for operating said pin (8) and/or said drive rod (12) in accordance with a program and in accordance with the type of use for which said subammunition bodies are intended.

2. The apparatus of claim 1, wherein said computer is so programmed that the simultaneous shifting of said pin (8) into its second safety-off position and the displacement of said drive rod (12) can take place simultaneously only if actual use conditions are present, for preventing an accidental or unintended unlocking of said safety means.

3. The apparatus of claim 1, wherein said safety means comprise an ignition circuit (17) and a short-circuit plug (15) in a contact socket in said safety means (14), and a spring (16) for biasing said short-circuit plug (15) into said first safety-on position in which said ignition circuit (17) is interrupted, said short-circuit plug (15) closing said ignition circuit (17) in response to being pulled out of said contact socket by said rope pull means (18).

4. The apparatus of claim 1, wherein said safety means (25) comprise a slide pin (28) biased by a spring (27) and connected to said rope pull means (18) for releasing a valve member (31) in response to a pull on said rope pull means (18).

5. The apparatus of claim 1, wherein said drive means (4a) for said pin (8) comprise a relay connected to said pin for shifting said pin in the release means between said first safety-on position and said second safety-off position.

6. The apparatus of claim 1, wherein said operating means (9) comprise a piston cylinder device including a cylinder (11) and a piston rod forming said drive rod (12), said piston rod (12) moving into said cylinder for applying a pulling force to said rope pull means (18).

* * * * *